(12) United States Patent
Haque et al.

(10) Patent No.: US 10,958,507 B2
(45) Date of Patent: Mar. 23, 2021

(54) WEB HANDLING SYSTEM

(71) Applicant: Fife Corporation, Oklahoma City, OK (US)

(72) Inventors: Md M. Haque, Oklahoma City, OK (US); Darcy Winter, Oklahoma City, OK (US); Wolfram Ploetz, Oklahoma City, OK (US); Darren Irons, Oklahoma City, OK (US); Shomari Head, Oklahoma City, OK (US); Rainer Sokoll, Oklahoma City, OK (US)

(73) Assignee: Maxcess Americas, Inc., Oak Brook, IL (US)

( * ) Notice: Subject to any disclaimer, the term of this patent is extended or adjusted under 35 U.S.C. 154(b) by 0 days.

(21) Appl. No.: 16/195,359

(22) Filed: Nov. 19, 2018

(65) Prior Publication Data

US 2019/0089580 A1    Mar. 21, 2019

Related U.S. Application Data

(62) Division of application No. 15/667,280, filed on Aug. 2, 2017, now abandoned.

(Continued)

(51) Int. Cl.
*H04L 12/24* (2006.01)
*H04L 12/801* (2013.01)
(Continued)

(52) U.S. Cl.
CPC ......... *H04L 41/0672* (2013.01); *B65H 23/02* (2013.01); *B65H 23/04* (2013.01); *H04L 12/422* (2013.01); *H04L 12/437* (2013.01); *H04L 41/0816* (2013.01); *H04L 45/28* (2013.01); *H04L 47/13* (2013.01); *B65H 2301/4148* (2013.01); *B65H 2557/12* (2013.01)

(58) Field of Classification Search
CPC ..... B65H 23/04; H04L 41/0672; H04L 45/28; H04L 47/13; H04L 12/422
See application file for complete search history.

(56) References Cited

U.S. PATENT DOCUMENTS 6,766,482 B1    7/2004 Yip et al.
7,796,500 B1    9/2010 Elliott et al.
(Continued)

FOREIGN PATENT DOCUMENTS

EP    2487819    8/2012

OTHER PUBLICATIONS

PCT International Search Report and Written Opinion regarding PCT Application No. PCT/US2017/045134, dated Dec. 8, 2017.

(Continued)

*Primary Examiner* — Syed Ali
(74) *Attorney, Agent, or Firm* — Dunlap Codding, P.C.

(57) ABSTRACT

A web handling system is described, including a plurality of web handling controllers and a web handling process logic controller networked to form a ring network. A processor of the web handling process logic controller being configured to determine whether a fault exists within the ring network, and responsive to determining that a fault exists within the ring network, to generate and send signals throughout the ring network to switch the configuration of the ring network to at least one linear network.

7 Claims, 4 Drawing Sheets

Related U.S. Application Data (60) Provisional application No. 62/369,982, filed on Aug. 2, 2016.

(51) Int. Cl.
    *B65H 23/02*     (2006.01)
    *B65H 23/04*     (2006.01)
    *H04L 12/42*     (2006.01)
    *H04L 12/437*     (2006.01)
    *H04L 12/703*     (2013.01)

(56) References Cited

U.S. PATENT DOCUMENTS

| | | | |
|---|---|---|---|
| 8,554,354 | B1 | 10/2013 | Pagilla et al. |
| 10,164,759 | B1 | 12/2018 | Volpe |
| 2001/0038608 | A1* | 11/2001 | De Girolamo ..... H04Q 11/0062 370/223 |
| 2006/0048577 | A1 | 3/2006 | Haque et al. |
| 2006/0082468 | A1 | 4/2006 | Wang et al. |
| 2006/0155816 | A1* | 7/2006 | Umei ..................... H04L 12/42 709/208 |
| 2006/0182044 | A1* | 8/2006 | Maisch .................. H04L 12/42 370/258 |
| 2010/0281178 | A1* | 11/2010 | Sullivan ............. H04N 21/2665 709/231 |
| 2011/0038633 | A1 | 2/2011 | DeCusatis et al. |
| 2013/0070773 | A1* | 3/2013 | Lee ..................... H04L 12/4637 370/400 |
| 2013/0227008 | A1* | 8/2013 | Yang ..................... H04J 3/0641 709/204 |
| 2013/0279525 | A1* | 10/2013 | Zheng .................. H04J 3/0667 370/516 |
| 2014/0209655 | A1* | 7/2014 | Haque .................. B65H 23/038 226/15 |
| 2014/0226459 | A1 | 8/2014 | Edmiston |
| 2015/0229388 | A1* | 8/2015 | Xu ......................... H04B 10/25 398/29 |
| 2015/0358210 | A1 | 12/2015 | Millet |
| 2016/0080100 | A1* | 3/2016 | Yan ....................... H04J 3/0667 370/216 |
| 2017/0346588 | A1* | 11/2017 | Prins ................... H04W 56/001 |
| 2018/0013508 | A1* | 1/2018 | Rabinovich ........... H04J 3/0667 |
| 2018/0041383 | A1* | 2/2018 | Haque ................. H04L 41/0672 |
| 2018/0191802 | A1* | 7/2018 | Yang ..................... G06Q 50/00 |
| 2019/0369252 | A1* | 12/2019 | Girotti .................... G01S 17/42 |

OTHER PUBLICATIONS

Introduction to Device Level Ring Topology for Ethernet IP, printed Jul. 11, 2016.

Yuan, Liang et al., "A Rapid Protection Switching Method in Carrier Ethernet Ring Networks," SPIE Digital Library, 2008.

Extended European Search Report regarding European Patent App. No. 17837614.1, dated Mar. 6, 2019.

USPTO Office Action regarding U.S. Appl. No. 15/667,280, dated Jul. 9, 2019.

* cited by examiner

WEB HANDLING SYSTEM

INCORPORATION BY REFERENCE

The present patent application is a divisional of and claims priority to U.S. patent application Ser. No. 15/667,280, filed Aug. 2, 2017, and claims the benefit of U.S. Provisional Patent Application Ser. No. 62/369,982, filed on Aug. 2, 2016, all of which are incorporated herein by reference in their entirety.

BACKGROUND

Pneumatic, photoelectric, and ultrasonic systems have been used for guiding material webs by edge detection or line detection. Photoelectric based systems, for example using optical sensors or infrared sensors, have been used to guide material webs based on features of the material web, such as an edge, an aspect of a material web at a given point on the material, or a printed graphic running longitudinally along the material web. Most sensors detect the web or its features by transmitting a signal and comparing a received signal through open atmosphere in relation to a received signal which has been passed through or interrupted by a web.

C shape sensors are common in web edge detection where the web passes through a gap in the C shape. Sensors are often housed in arms of the C extending at least partially across the web. The sensors may be divided between transmitter and receiver elements. The gap of the C shape sensors extend between the arms and may limit acceptable deviations in the web plane of the traveling web while passing through the C shape sensor. In order to overcome this limitation, C shape sensors may be mounted on or connected to an articulable element, known as a moving sensor guide that allows the C shape sensors to move in response to changes in the width of the material web. In addition, rollers may be employed, such as fixed support bars, close to the C shape sensors enabling better control over the web plane and enabling use of C shape sensors using smaller gaps. A plurality of C shape sensors have been used to guide a single material web, with sensors on either side of the material web, to simultaneously perform edge detection on opposing edges of the material web.

C shape sensors may be used in ultrasonic guiding systems, for example as described in U.S. Pat. No. 7,415,881. C shape sensors are also used in photoelectric systems as described in U.S. Pat. No. 4,291,825 that uses infrared sensing devices to perform web edge sensing to guide the material web.

Line sensors may be used which scan graphical patterns on the web, without performing edge detection, for guiding the material web. Line sensors may capture images and guide the material web based on a comparison of the images and the location of the graphical patterns with a stored set point. Line sensors may have a horizontal field of view that spans a portion or the entirety of the material web between opposing edges. However, the line sensors have a field of view in the web direction of travel that is limited to one pixel and encompasses no more than 5-7 microns of the web in the web direction of travel. Other sensors used in web guiding may include laser curtain sensors, ragged edge sensors, fiber optics sensors, raised feature sensors, capacitance or inductance sensors, and mechanical paddle or finger sensors.

Visual inspection systems for providing quality assurance to moving webs of material currently exist. One visual inspection system is sold under the trademark InPrint™ by Fife Corporation, the assignee of the present patent application. This visual inspection system provides quality assurance by allowing direct, live image viewing of a moving web. In particular, this visual inspection system captures images of a moving web at 10 images/second and compares the captured images to a reference image of the web to detect deviations of the captured image from the reference image. When deviations are detected, the visual inspection system sounds an alarm, and/or directs a particular product to an appropriate location to be manually inspected.

Web handling systems include tension control components that are used to control the tension in a web of material. The tension in the web is detected by a load cell bearing sensor on the web of material, and the tension is controlled by a brake or clutch system that can vary the rate of movement of a roller for feeding and/or retrieving of the web of material. The tension control components also include a controller to receive information indicative of the tension in the web of material from the load cell bearing sensor and generate control signals that are transmitted to the brake or clutch system to control the tension in the web. Other tension control components include load cells, load cell-based tension controllers, tension readouts, dancer controllers, magnetic particle clutches and brakes, and permanent magnet brakes and clutches.

In certain applications, web handling systems also include systems for physically modifying or manipulating the web of material. These types of web handling systems include slitting systems used for cutting the web of materials along the web's longitudinal axis, and bowed rolls or spreader rolls used for separating parts of the web of material. Other slitting products include electronic and pneumatic knifeholders, slitter positioning systems, fully automated shear slitting systems, and mechanically linked slitting systems.

In certain applications, web handling systems also include winding products including core shafts, air shafts, expansion shafts, web shafts and core holders, pneumatic brakes, safety chucks, core chucks, shaftless chucks and crushed core restorers.

Various web handling systems can be combined into one or more process line used for guiding, tensioning, slitting, and inspecting one or more webs of material to make predetermined products, such as diapers. These web handling systems have multiple controllers and sensors that are interconnected via a star network topology.

BRIEF DESCRIPTION OF DRAWINGS

Certain embodiments of the present inventive concepts will hereafter be described with reference to the accompanying drawings, wherein like reference numerals denote like elements, and.

DESCRIPTION OF EXEMPLARY EMBODIMENTS

Specific embodiments of the present disclosure will now be described in detail with reference to the accompanying drawings. Further, in the following detailed description of embodiments of the present disclosure, numerous specific details are set forth in order to provide a more thorough understanding of the disclosure. However, it will be apparent to one of ordinary skill in the art that the embodiments disclosed herein may be practiced without these specific details. In other instances, well-known features have not been described in detail to avoid unnecessarily complicating the description.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

The prior art web handling systems can be improved by providing better networking solutions, and time-based synchronization of the controllers and sensors. It is to such an improved web handling system that the present disclosure is directed.

Figure 1:
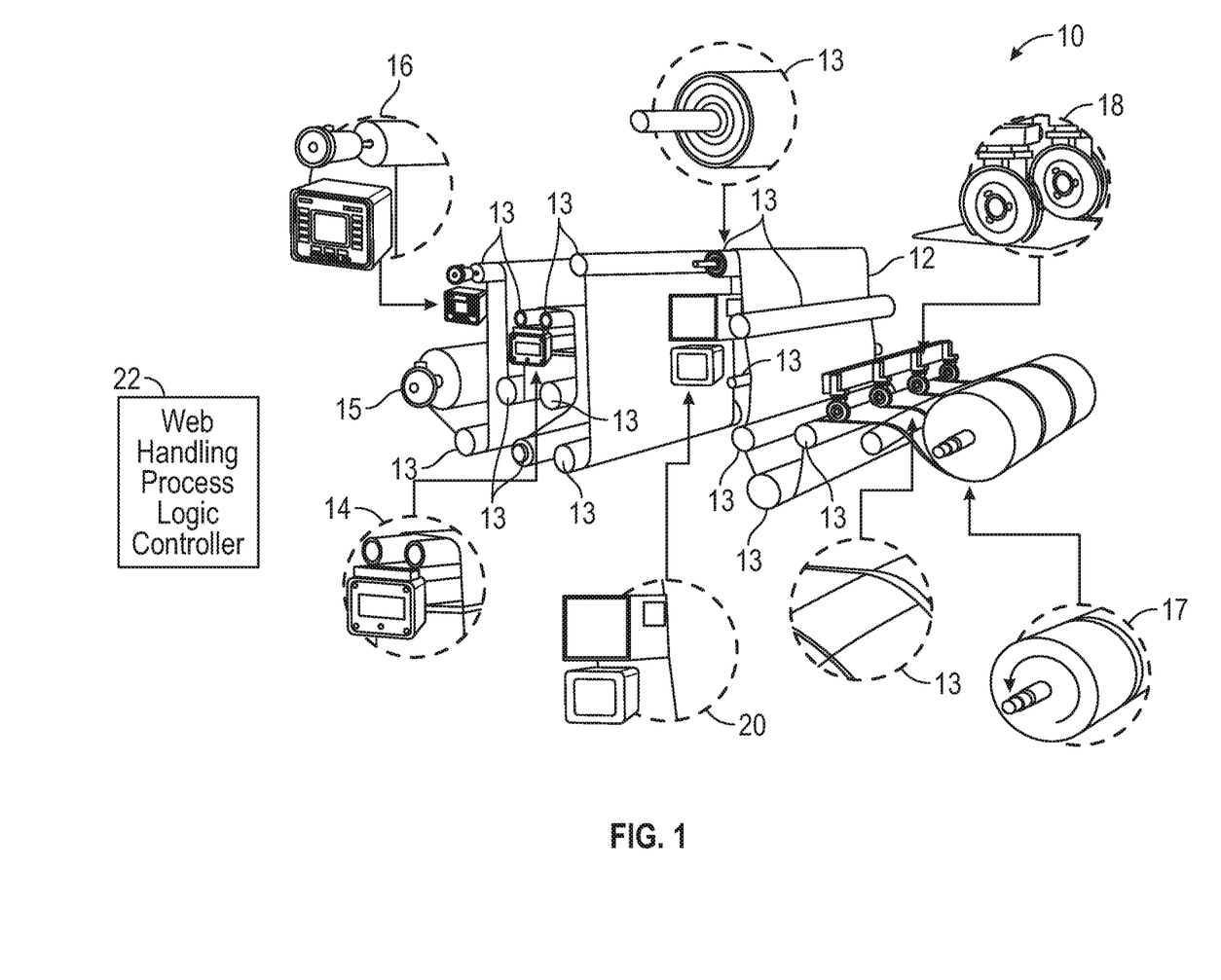
FIG. 1 is an embodiment of a web handling system in accordance with the present disclosure.
Figure 4:
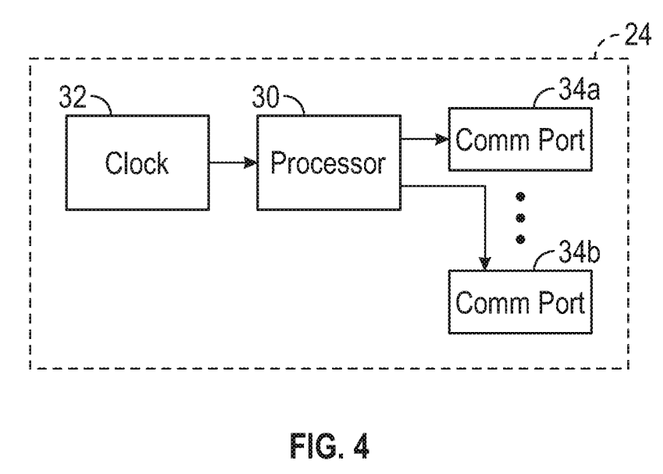
FIG. 4 is a schematic view of an exemplary web handling controller constructed in accordance with the present disclosure.
Figure 5:
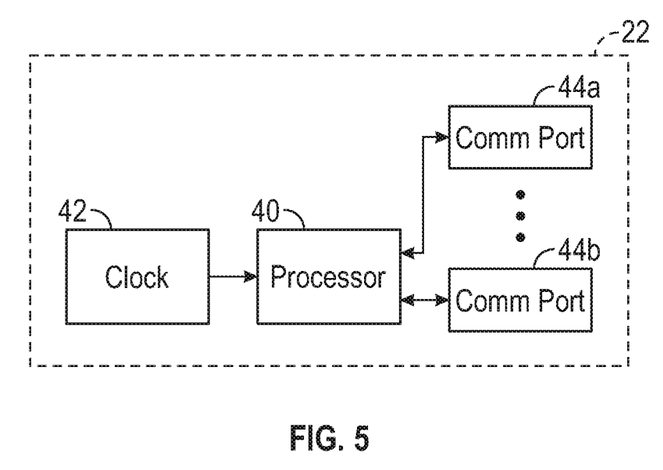
FIG. 5 is a schematic view of an exemplary web handling process logic controller constructed in accordance with the present disclosure.

Referring now to the figures, shown in FIG. 1 is a web handling system 10 for handling a continuous material web 12. The continuous material web 12 is passed over a variety of rollers 13 in accordance with the present disclosure. The rollers 13 may include cylinderically shaped web rollers or other types of rollers, including, but not limited to heat transfer rollers, idler rollers, vacuum rollers, bowed rollers and spreader rollers. The web handling system 10 may be used in web guiding, tension control, and quality inspection industries, for example. The web handling system 10 includes, by way of example, one or more web guiding systems 14, one or more supply roller 15, one or more tension control systems 16, one or more windup roller 17, one or more slitting systems 18 and one or more video web inspection systems 20 synchronized by a web handling process logic controller 22. Each of the web guiding systems 14, tension control systems 16, slitting systems 18, video web inspection systems 20 has a web handling controller 24 (shown by way of example as 24-1, 24-2, 24-3 and 24-4) in FIGS. 2 and 3 that will be discussed in more detail below. The web handling controllers 24 are also networked with a web handling process logic controller 22. As shown in FIG. 4, the web handling controllers 24 are provided with a processor 30, a clock 32 and at least two separate network communication ports 34a and 34b. The processor 30 is coupled to the clock 32 and the at least two separate network communication ports 34a and 34b. The processor 30 receives clock signals from the clock 32 and may synchronize the clock signals with a master clock, as discussed below. As shown in FIG. 5, the web handling process logic controller 22 is also provided with a processor 40, a clock 42 and at least two separate network communication ports 44 (that are designated in FIG. 4 with the reference numerals 44a and 44b). The processor 40 is coupled to the clock 42 and the at least two separate network communication ports 44a and 44b. The processor 40 receives clock signals from the clock 42 and may transmit timing signals the the web handling controllers 24 such that the clock 42 becomes a master clock for all of the web handling controllers 24 within the network, as described below.

As will be described below, the processor 40 of the web handling process logic controller 22 and the processors 30 of the web handling controllers 24 are programmed or hardware configured to communicate using a ring-network topology having the ability to detect a fault in the network, and to automatically switch from a network using a ring topology to two separate linear topological networks. Once the web handling process logic controller 22 and the web handling controllers 24 switch to the linear topological networks, the web handling process logic controller 22 sends out a series of neighbor check requests from the communication ports 44a and 44b to cause each of the web handling controllers 24 to check to see if the web handling controllers 24 can communicate with its neighbors in the linear topological networks. This check can be accomplished by the web handling controllers 24 polling neighboring web handling controllers 24 and then reporting back to the web handling process logic controller 22. Utilizing a ring topology that can switch to two separate linear topological networks provides the web handling system 10 with enhanced communication reliability and redundancy as compared to the prior art web handling systems that utilize a star network topology.

Figure 2:
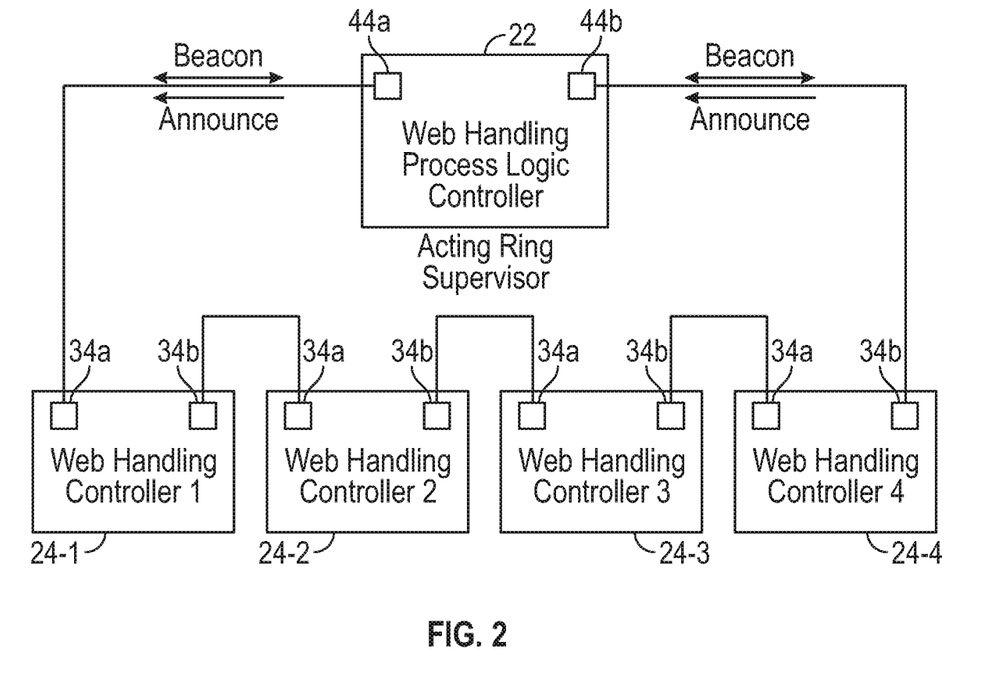
FIG. 2 is a schematic view of a web handling process logic controller networked with a plurality of web handling controllers in accordance with the present disclosure.
Figure 3:
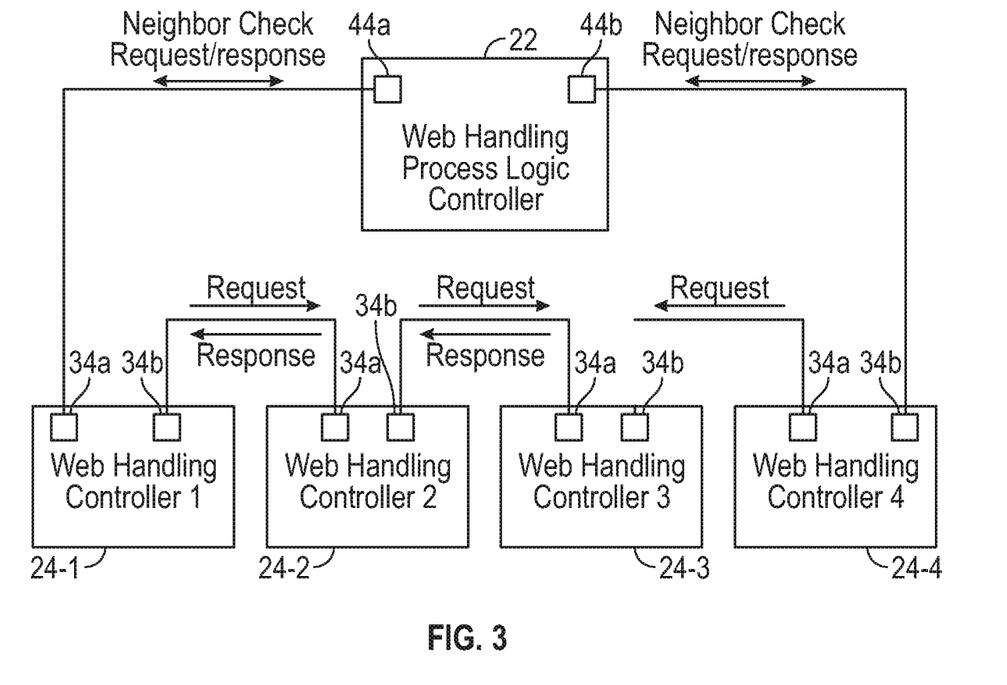
FIG. 3 is a schematic view of the web handling process logic controller networked with the plurality of web handling controllers in which a fault is being detected in the web handling controller 24-3 in accordance with the present disclosure.

For example, as shown in FIGS. 2 and 3, the web handling controller 24-1 polls the web handling controller 24-2; the web handling controller 24-2 polls the web handling controller 24-3; and the web handling controller 24-3 polls the web handling controller 24-4. Likewise, the web handling controller 24-4 receives the neighbor check request and then polls the web handling controller 24-3; the web handling controller 24-3 polls the web handling controller 24-2; and the web handling controller 24-2 polls the web handling controller 24-1. In this manner, at some point within the network two of the web handling controllers 24-1-24-4 will not receive a neighbor check response due to a fault in the network. By polling neighboring web handling controllers 24, the web handling process logic controller 22 determines a location of the fault in the network, and also determines the identity of the web handling controllers 24 on each of the linear topology networks. For example, as shown in FIG. 3, a fault exists between the communication port 34a of the web handling controller 24-4, and the communication port 34b of the web handling controller 24-3. In this example, the web handling process logic controller determines the location of the fault, due to the web handling controller 24-4 transmitting a request and not receiving a neighbor check response.

In one embodiment, the web handling process logic controller 22 and the web handling controllers 24 utilizing a device level ring protocol and an ethernet networking protocol to communicate. In this embodiment, the device level ring protocol provides high network availability in a ring topology for the web handling process logic controller 22 and the web handling controllers 24. In this embodiment, the communication ports 34a, 34b, 44a and 44b are Ethernet ports with embedded switch technology. The device level ring protocol provides fast network fault detection and reconfiguration in order to support the most demanding web handling control applications.

In one embodiment, the device level ring protocol operates at Layer 2 (in the ISO OSI network model). Thus, the presence of the ring topology and the operation of the device level ring protocol are transparent to higher layer protocols such as TCP/IP and CIP, with the exception of a device level ring Object that provides a device level ring configuration and diagnostic interface via CIP.

In one embodiment, the processor 40 of the web handling process logic controller 22 is programmed with a ring supervisor that monitors traffic on the communication ports 44a and 44b. The ring supervisor can control the traffic on the communication ports 44a and 44b to selectively prevent packets from circulating within the network, as well as to send beacon frames and/or announce frames.

Beacon frames can be sent from both of the web handling process logic controller 22 communication ports 44a and 44b to detect cable breaks and/or malfunctions of any one of the web handling controllers 24. The beacon frames can also carry precedence values so that an acting supervisor can be determined on a network with multiple ring supervisors. In one embodiment, by default, Beacon frames are sent out at an interval of 400 μs and during ring state change.

Announce frames are sent from the unblocked port at a predetermined interval, such as once per second, and during ring state change. The announce frames may transmit instructions about topology reconfigurations.

In some embodiments, each of the web handling process logic controller 22 and the web handling controllers 24 have a unique address, such as a MAC address. When the web handling process logic controller 22 receives a packet on one of the communication ports 44a or 44b, e.g., the communication port 44a, the web handling process logic controller 22 determines whether the packet needs to be received and interpreted by itself (e.g., the packet has the web handling process logic controller's MAC address) or whether the packet should be forwarded via the other communication port 44a or 44b, e.g., the communication port 44b. Likewise, when the web handling controller 24 receives a packet on one of the communication ports 34a or 34b, e.g., the communication port 34a, the web handling controller 24 determines whether the packet needs to be received and interpreted by itself (e.g., the packet has the web handling process logic controller's MAC address) or whether the packet should be forwarded via the other communication port 34a or 34b, e.g., the communication port 34b.

The active ring supervisor running on the processor 40, blocks traffic on one of the communication ports 44a and 44b with the exception of few special frames and does not forward traffic from one communication port 44a to 44b to the other communication port 44a to 44b. Because of this configuration a network loop is avoided and only one path exists between any two of the web handling process logic controller 22 or the web handling controllers 24 during normal operation. In some embodiments, the web handling process logic controller 22 is always the active ring supervisor and transmits a beacon frame through both communication ports 44a and 44b at a predetermined interval or random interval, such as 400 μs.

For most implementations, beacon-based device level ring is preferred due to faster fault detection and recovery times. The active ring supervisor also sends announce frames at a predetermined or random interval, such as once per second.

The beacon and announce frames serve several purposes. First, the presence of beacon and announce frames inform the web handling controllers 24 to transition from linear topology mode to ring topology mode and vice versa. Second, a loss of beacon frames at the web handling process logic controller 22 enables detection of certain types of ring faults. (Note that the web handling controllers 24 are also able to detect and signal ring faults). Third, in some embodiments, the beacon frames carry a precedence value, allowing selection of an active supervisor when multiple ring supervisors are configured.

The web handling process logic controller 22 and the web handling controllers 24 can also be configured to synchronize clocks 32 and 42 using any suitable protocol, such as a protocol known as precision time protocol. Suitable versions of precision time protocols are described in IEEE 1588-2002 and 1588-2008.

Precision time protocol described in IEEE 1588-2002 and 1588-2008 uses a hierarchical master-slave architecture for clock distribution. Under the precision time protocol architecture, a time distribution system consists of one or more communication media (network segments), and one or more clocks, such as the clocks 32 and 42. An ordinary clock is a device with a single network connection and is either the source of (master) or destination for (slave) a synchronization reference. A boundary clock has multiple network connections and can accurately synchronize one network segment to another. A synchronization master is selected for each of the network segments in the system. The root timing reference is called the grandmaster. The grandmaster transmits synchronization information to the clocks residing on its network segment. The boundary clocks with a presence on that segment then relay accurate time to the other segments to which they are also connected.

A simplified PTP system frequently consists of ordinary clocks connected to a single network, and no boundary clocks are used. A grandmaster is elected and all other clocks synchronize directly to it.

IEEE 1588-2008 introduces a clock associated with network equipment used to convey PTP messages. The transparent clock modifies PTP messages as they pass through the web handling process logic controller 22, and/or one of the web handling controllers 24. Timestamps in the messages are corrected for time spent traversing the network equipment. This scheme improves distribution accuracy by compensating for delivery variability across the network.

PTP typically uses the same epoch as Unix time (Midnight, 1 Jan. 1970). While the Unix time is based on Coordinated Universal Time (UTC) and is subject to leap seconds, in some embodiments PTP is based on International Atomic Time (TAI) that moves forward monotonically. The PTP grandmaster communicates the current offset between UTC and TAI, so that UTC can be computed from the received PTP time.

Synchronizing the clocks, such as by using PTP, in web handling (guiding, tension control, slitter positioning etc.) applications provides the mechanism to synchronize the web handling controllers 24 across the network. This is important from a guiding and web handling perspective as this allows sensor signals (such as the position or tension of the web of material) to be collected or generated from any web handling controller 24 to be broadcast on the network and shared among specific or all web handling controllers 24.

Each web handling controller 24 provides one or more independent closed loop control systems. The nature of closed loop control systems dictate that phase jitter of the sensor signals used as inputs to the control loop be minimized or eliminated. In the presently disclosed web handling controllers 24, very precise timing via any suitable logic, such as FPGA logic, may be used to collect analog signals cyclically at consistent moments in time to prevent signal phase deviations and jitter. Control loop calculations performed in software are also synchronized to the same sampling process by virtue of high priority CPU interrupt mechanisms so calculations are done with the most recent data available. This provides control signals generated at precise cyclical moments to maximize the web controller stability and correction speed.

The timing logic inside each web handling controller 24 also contains additional capability to generate and accept signals to synchronize the previously described cyclic signal sampling process of the web handling controllers 24 across the network, thus providing the basis for shared guiding signals between units with signals that remain in phase and contain minimum jitter. By maintaining the same signal timing integrity across the network, control loops running in any connected web handling controller 24 can use remote sensor data as if the remote sensor data were collected locally without penalizing control loop performance.

The timing logic, using precision time protocol for example, results in clock synchronization. Because the clocks of the web handling controllers 24 in the network are precisely synchronized, the closed loop control process previously described is also synchronized. Synchronization implies that a single clock source must become the master to which all other web handling controllers 24 seek to mirror. Again the precision time protocol, for example, provides the means to accomplish this by the precision time protocol's use of an arbitration system to determine which device (e.g., the web handling process logic controller 22, or one of the web handling controllers 24 will be the master. In order to work in harmony with existing precision time protocol mechanisms that may be present in any given network, the web handling controllers 24 described herein may implement precision time protocol in such a way that they will not become precision time protocol masters, however, in absence of other precision time protocol masters in the network, the presently disclosed web handling controllers 24 will automatically arbitrate a precision time protocol master when needed in order to synchronize the control loops of the web handling controllers 24.

Several mechanisms are at work inside the timing logic to accomplish synchronization. The timing logic may have the capability to "snap" instantly to a clock value, which is often done when a device (e.g., the web handling process logic controller 22, or the web handling controllers 24) is first powered on with existing precision time protocol clocks already established. As the precision time protocol process runs on the processor 30 and the processor 40, for example, the presently disclosed web handling controllers 24 may use a control algorithm fed by the amount of correction needed from each adjustment moment to actually tune the timing logic, e.g., FPGA clock frequency. In this embodiment, the clock 32 is a FPGA clock. This makes the clock 32 of the web handling controller 24 seek the same frequency as the master clock resulting in smaller adjustments. In some embodiments, this process runs continuously on the processor 30 of the web handling controller 24 to maintain synchronization.

Figure 6:
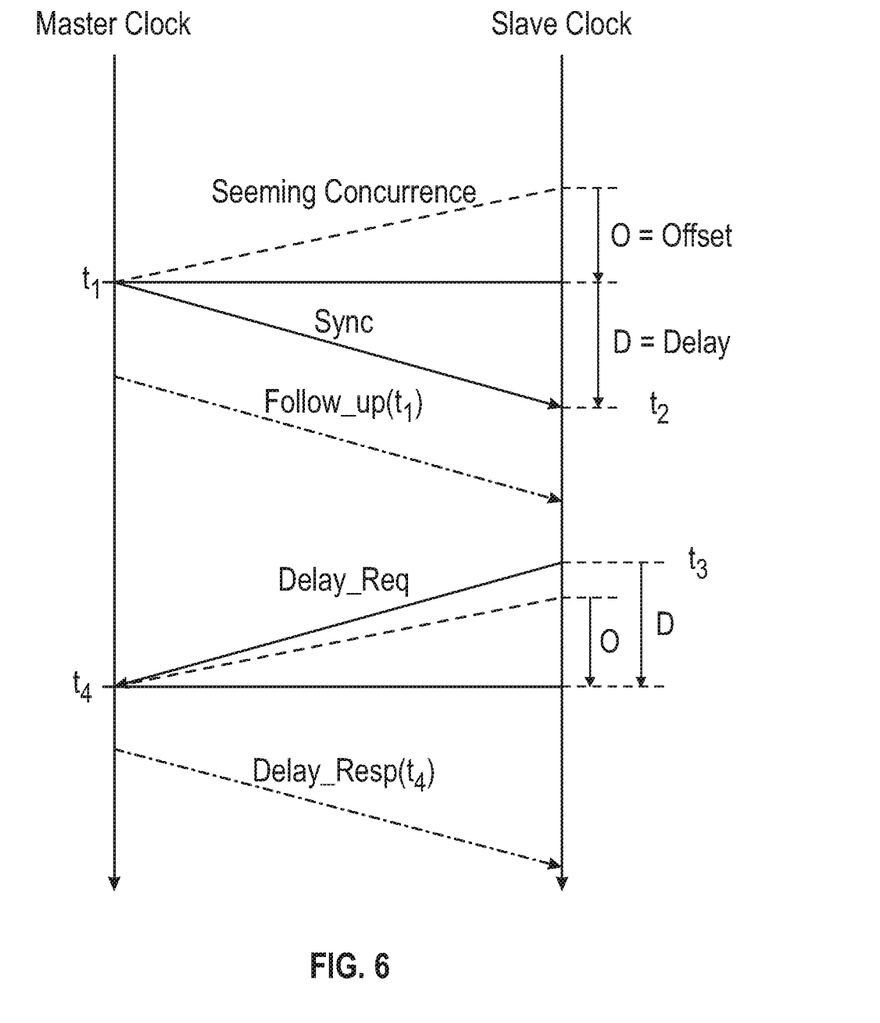
FIG. 6 is a timing diagram illustrating an exemplary sequence of events utilized in synchronizing slave clocks with a master clock in accordance with the present disclosure.

FIG. 6 shows an exemplary method that may be run by the processor 30 of the web handling controller 24 to synchronize a slave clock to a master clock in accordance with the present disclosure. In this example, an Offset and Network Propagation Delay used by processor 30 of the web handling controllers 24 to synchronize the clock 32 with the clock 42 can be calculated as follows:

$$\text{Delay} + \text{Offset} = t2 - t1$$

$$\text{Delay} - \text{Offset} = t4 - t3$$

$$\text{Delay} = ((t2-t1)+(t4-t3))/2$$

$$\text{Offset} = ((t2-t1)-(t4-t3))/2$$

In some embodiments, the processor 30 of one of the web handling controllers 24, or the processor 40 of the web handling process logic controller 22 acting as a slave clock (referred to herein as the "slave clock") synchronizes the clock 32 or the clock 42 to the master clock of the network by using a bidirectional multicast communication as shown in FIG. 6. In some embodiments, the synchronization of the clock 32 or the clock 42 can be accomplished as follows. The processor 30 of the one of the web handling controller 24 or the processor 40 of the web handling process logic controller 22 acting as the master clock (referred to herein as the "master clock") issues a synchronization packet containing a timestamp of the time when the synchronization packet left the master clock via one of the communication ports 34a, 34b, 44a, or 44b. The master clock may also, optionally, issue a follow-up packet containing a timestamp for the synchronization packet. The use of a separate follow-up packet allows the master clock to accurately timestamp the synchronization packet on networks where the departure time of a packet cannot be known accurately beforehand. For example, collision detection and random backoff mechanisms of ethernet communication prevents the exact transmission time of a packet from being known until the packet is completely sent without a collision being detected, at which time it is impossible to alter the packets content. A slave clock receives the master clock synchronization packet and timestamps the packets arrival using the slave clock's own clock 32 or 42. The difference in the synchronization packet's departure timestamp and the synchronization packets arrival timestamp is a combination of the slave clock's offset from the master clock and the network propagation delay. By measuring and storing the offset and using the offset to adjust the slave clock by the offset measured at this point, the offset between the master clock and the slave clock can be reduced to the network propagation delay only.

In some embodiments, the processor 30 of the web handling controller 24 or the processor 40 of the web handling process logic controller 22 acting as the master clock operates under an assumption that the network propagation delay is symmetrical. That is, the delay of the packet sent from the master clock to a slave clock is the same as the delay of a packet sent from the slave clock to the master clock. By making this assumption, the slave clock can discover and compensate for the propagation delay. The slave clock accomplishes this by issuing a request packet which is time stamped on departure from the slave clock. The request packet is received and timestamped by the master clock, and the arrival timestamp is sent back to the slave clock in a delay packet. The difference in the two timestamps is the network propagation delay.

By sending and receiving the synchronization packets, the slave clocks can accurately measure the offset between the slave clock's clock 32 or 42 and the master clock. The slave clocks can then adjust their clocks by this offset to match the time of the master clock.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Also, certain portions of the implementations may have been described as "components" or "circuitry" that perform one or more functions. The term "component" or "circuitry" may include hardware, such as a processor, an application specific integrated circuit (ASIC), or a field programmable gate array (FPGA), or a combination of hardware and software.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:

1. A web handling system comprising:
a plurality of web handling controllers, each of the web handling controllers having a web handling processor, a first communication port and a second communication port; and
a web handling process logic controller having a processor, a third communication port and a fourth communication port, the first communication port, the second communication port, the third communication port and the fourth communication port being connected to form a ring network, the processor of the web handling process logic controller being always configured as an active ring supervisor to determine whether a fault exists within the ring network, and responsive to determining that a fault exists within the ring network, to generate and send signals throughout the ring network to switch the configuration of the ring network to at least one linear network and
wherein at least one of the web handling processor or the processor of the web handling process logic controller synchronizes a slave clock to a master clock using a series of timestamped synchronization packets to determine an offset between the master clock and the slave clock, in which a first departure time of a first timestamped synchronization packet is denoted t1, and a first receive time of the first timestamped synchronization packet is denoted t2, a second departure time of a second timestamped synchronization packet is denoted t3, and a second receive time of the second timestamped synchronization packet is denoted t4, and wherein a network propagation delay+offset=t2−t1; and the network propagation time−Offset=t4−t3.

2. The web handling system of claim 1, wherein one of the web handling controllers is a component of a web guiding system.

3. The web handling system of claim 1, wherein one of the web handling controllers is a component of a web tension control system.

4. The web handling system of claim 1, wherein one of the web handling controllers is a component of a video web inspection system.

5. An apparatus, comprising:
a web handling process logic controller having a processor, a first communication port and a second communication port, the processor configured to control the first communication port, and the second communication port to be a part of a ring network, the processor of the web handling process logic controller also being always configured as an active ring supervisor to determine whether a fault exists within the ring network, and responsive to determining that a fault exists within the ring network, to generate and send first signals via the first communication port and second signals via the second communication port, the first and second signals including instructions to switch the configuration of the ring network to at least one linear network, wherein the processor synchronizes a slave clock to a master clock using a series of timestamped synchronization packets to determine an offset between the master clock and the slave clock, in which a first departure time of a first timestamped synchronization packet is denoted t1, and a first receive time of the first timestamped synchronization packet is denoted t2, a second departure time of a second timestamped synchronization packet is denoted t3, and a second receive time of the second timestamped synchronization packet is denoted t4, and wherein a network propagation delay+offset=t2−t1; and the network propagation time−Offset=t4−t3.

6. The apparatus of claim 5, wherein the processor is configured to be a ring supervisor that monitors traffic on the first and second communication ports, the processor also controlling the traffic on the first and second communication ports to selectively prevent packets from circulating within the ring network.

7. The apparatus of claim 6, wherein the processor is configured to be the only ring supervisor within the ring network.

* * * * *